J. S. PADON.
Wheel-Plow

No 39,743.

Patented Sept. 1, 1863

Witnesses:

Inventor:
John S Padon.
By Amos Broadus, Atty.

UNITED STATES PATENT OFFICE.

JOHN S. PADON, OF LEBANON, ILLINOIS.

IMPROVEMENT IN GANG-PLOWS.

Specification forming part of Letters Patent No. 39,743, dated September 1, 1863; antedated March 1, 1863.

*To all whom it may concern:*

Be it known that I, JOHN S. PADON, of Lebanon, in the county of St. Clair and State of Illinois, have invented certain new and useful Improvements in Gang-Plows; and I do hereby declare the following to be a full, clear, and exact description of the same, reference being had to the annexed drawings, making part of this specification, in which—

Figure 1:
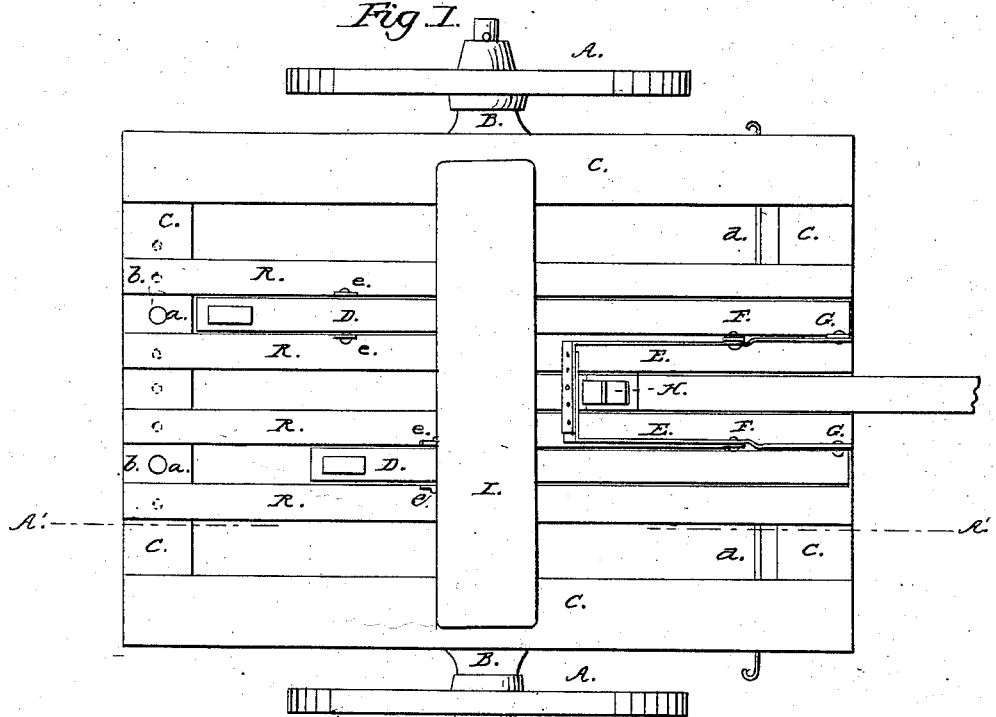
Figure 2:
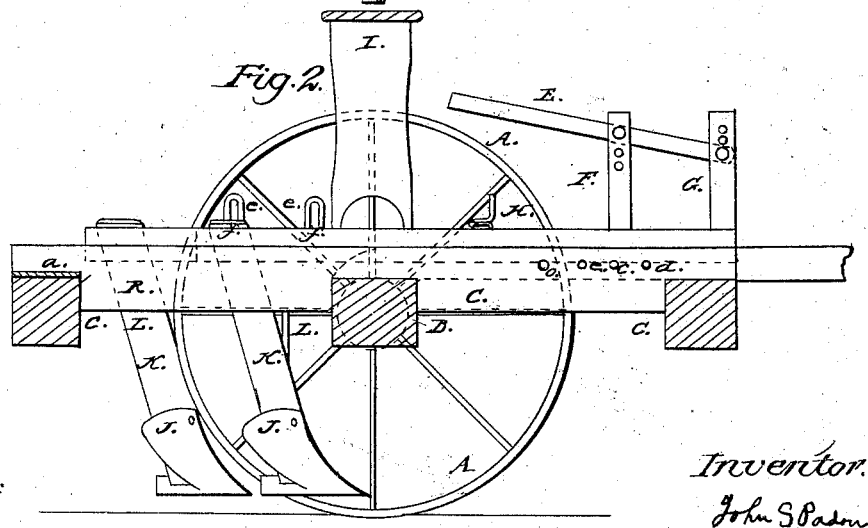

Figure 1 is a top view, and Fig. 2 is vertical longitudinal section taken on the line A' of Fig. 1.

The following description and claims will enable any one skilled in the arts to which my invention appertains to understand what it consists of and how to make and use it.

Like letters of reference represent like parts of the different figures of the annexed drawings.

A represents the truck-wheels of the machine; B, the axle of said wheels; C, the main frame.

R R are a pair of sills united at their front and rear ends by means of plates *a a*. The front and rear ends of these sills rest upon the front and rear beams of the main frame, and are secured by means of bolts or screws, *b b*, a number of holes being made in the front and rear beams of the frames, as indicated by dotted lines, for the said screws to enter, by which the frames composed of sills R can be adjusted to or from each other.

D D are the plow-beams, arranged between the sills R. The front end of said beams rest upon the bolts *d*, which may be moved toward the front or rear end of the frame, there being a series of holes, *c c c*, made in the frame for that purpose. By these means the depth of the plow is regulated.

*e e* are segmental plates with correspondingly-shaped slots cut in them, in which pins *f f* work, and by which the plow-beams are guided and steadied when raised up from between the sills to lift the plows out of the ground.

E E are levers for raising and lowering the front ends of the plow-beams, so as to throw the plows in or out of the ground. When the front ends of the beams are raised the points of the plowshares run out of the ground, throwing up the rear ends of the beams, thus allowing the plows to slide along on the ground without throwing the truck-wheels A off of it.

F F are the fulcrums of the levers aforesaid, and G G the standards to which they are attached, both of which are perforated, so as to adjust the throw of the lever, and consequently the height to which they will lift the plow-beams. Said levers may be worked jointly or separately, and this may be secured by means of a catch, H, fixed either to the tongue or to the sills R, as may be indicated by convenience.

The machine illustrated by the drawings has only two plows, but it may be readily extended so as to increase the number of plows whenever it may be desirable. The rear plow is made smaller than the forward one, so as to equalize the draft on the machine, as the forward plow, being nearer to the beam, will draw easier than the rear one, for which reason I make the last-mentioned plow the smaller; and this principle should be observed when the number of plows is multiplied. When a small-sized set of plows is taken off the machine and a large set applied, the frames, consisting of the sills R, must be moved apart, so as to increase the distance between the plows, and vice versa when small plows are substituted for large ones.

The driver's seat is represented by I and the plows by J, and the staff and braces of said plows are shown by K and L.

Having now described the construction and operation of my improved gang-plow, I claim as my invention and desire to secure by Letters Patent—

1. The combination of the movable frames, consisting of the sills R R, with the main frame, when they are arranged on said frame as described, and when said frame is mounted on truck-wheels as described.

2. The combination of the movable and adjustable plow-beams D with the sills R, when said beams are made to operate in connection with said sills, substantially as described.

JOHN S. PADON.

Witnesses:
JOHN M. CHAMBERLIN,
WM. H. HYPES.